United States Patent [19]

Takagi et al.

[11] 4,274,547
[45] Jun. 23, 1981

[54] ENCLOSED SWITCHBOARD

[75] Inventors: Masatomo Takagi, Hachioji; Tsuguo Noritake; Mitsuo Ogaki, both of Fuchu, all of Japan

[73] Assignee: Tokyo Shibaura Henki Kabushiki Kaisha, Tokyo, Japan

[21] Appl. No.: 98,024

[22] Filed: Nov. 28, 1979

[30] Foreign Application Priority Data

Dec. 4, 1978 [JP] Japan ............................ 53-149057

[51] Int. Cl.³ .................... B65D 6/28; A47B 55/00
[52] U.S. Cl. .................................... 220/4 R; 220/84; 312/108; 312/257 SK; 312/257
[58] Field of Search .............. 220/4 R, 4 F, 80, 83, 220/84; 312/108, 257 SK, 257 R, 257 SM, 257 A, 263, 264, 350

[56] References Cited

U.S. PATENT DOCUMENTS

| 2,042,848 | 6/1936 | Horn | 220/4 R |
| 2,196,399 | 4/1940 | Rubel | 220/84 |
| 2,686,704 | 8/1954 | Wolters | 312/350 |
| 2,727,800 | 12/1955 | Snider | 312/263 |
| 3,056,639 | 10/1962 | Caminker | 220/4 R |
| 3,192,306 | 6/1965 | Skonnord | 312/257 SK |

Primary Examiner—George E. Lowrance
Attorney, Agent, or Firm—Stevens, Davis, Miller & Mosher

[57] ABSTRACT

In an enclosed switchboard, each of side plates is provided, along both edges thereof, with vertically extending ribs having a U-shaped cross section protruding toward the confronting side plate. Connecting members for connecting the side plates are formed to fit in U-shaped cutaway portions provided at the upper and the lower ends of the ribs. A vertically extending opening is provided in the side plate to permit ventilation and wirings through the side plate.

7 Claims, 8 Drawing Figures

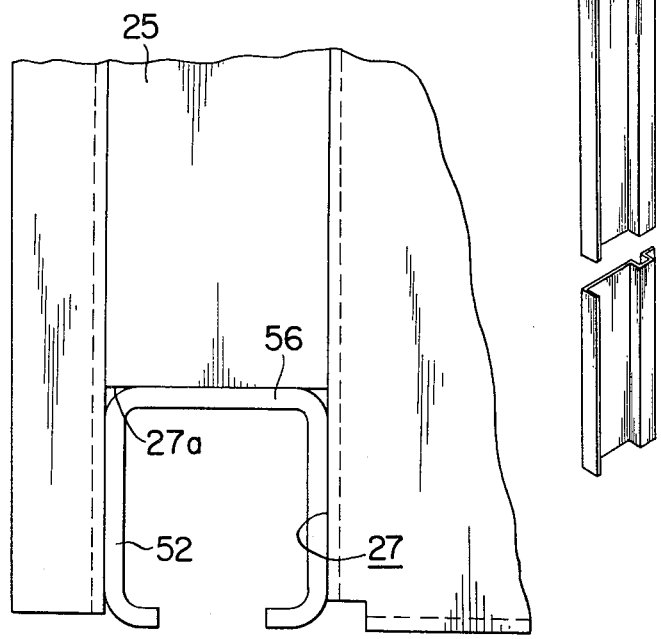
PRIOR ART
FIG. 3
FIG. 5
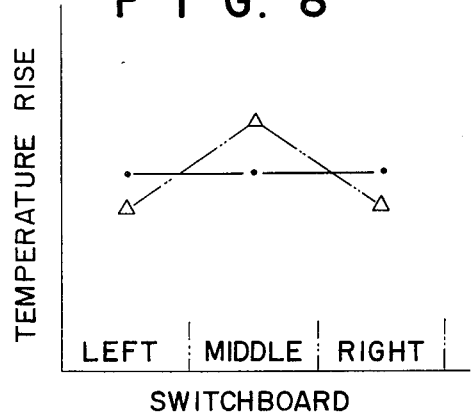
FIG. 8

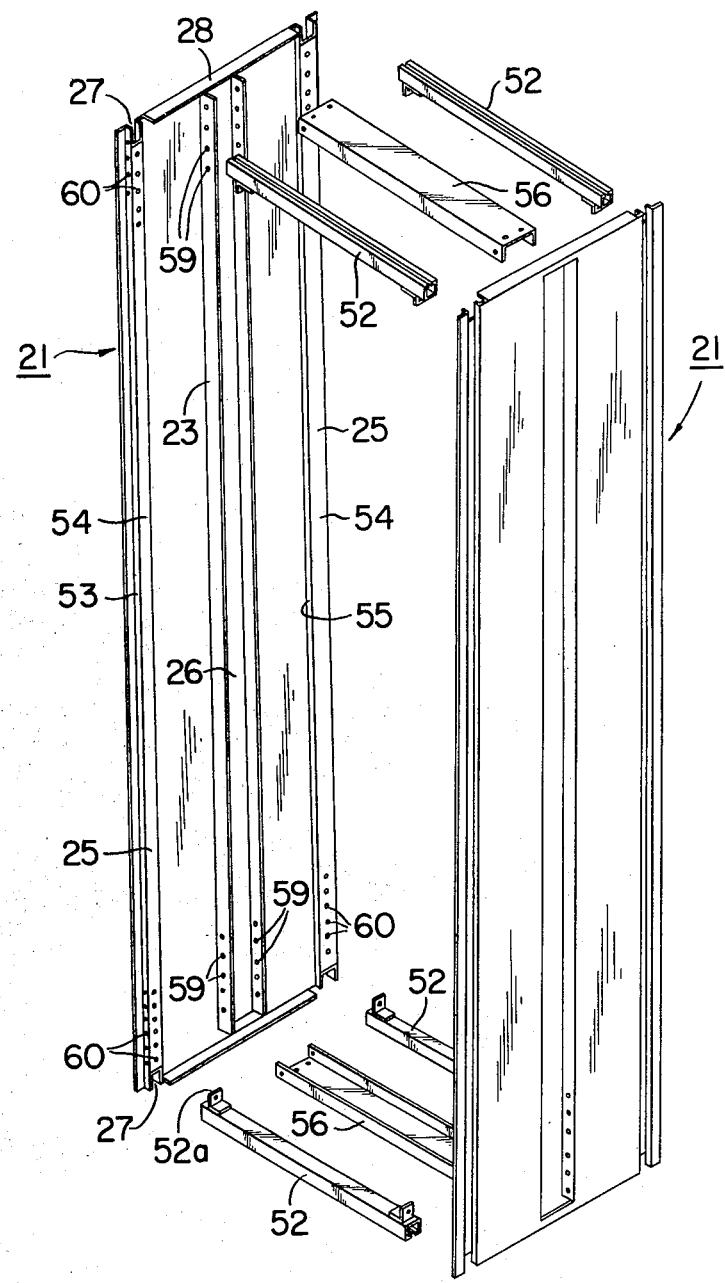

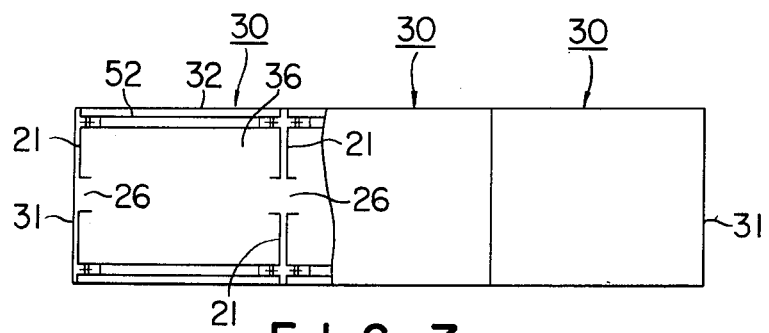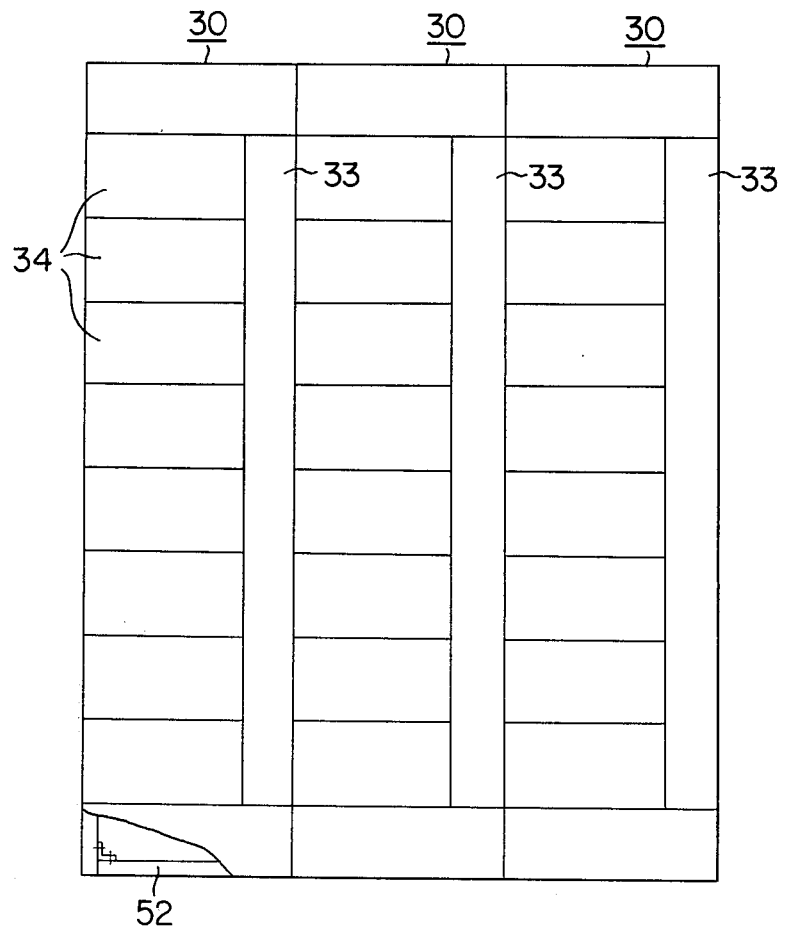

ENCLOSED SWITCHBOARD

BACKGROUND OF THE INVENTION

The present invention relates to an enclosed switchboard.

Prior art enclosed switchboards used in a control center are shown in FIGS. 1 and 2. As shown in FIGS. 1 and 2, a plurality of enclosed switchboards 2 are disposed side by side, each comprising a plurality of stacked unit devices 1, for example. A vertical housing 6 forming the external case of each switchboard 2 comprises side plates 3, a back plate 4 and a front panel 5.

Various electrical devices and supporters thereof have to be mounted in the vertical housing 6. Mounting them directly onto the flat side plates 3 is difficult and does not provide sufficient mechanical strength, so that support plates 12 as shown in FIG. 3 are provided inside of the side plates 3. As illustrated in FIG. 1, a pair of support plates 12 are disposed on one of the side plates 3, adjacent to each other, and another pair of support plates 12 are disposed on the other side plate 3, adjacent to each other, to confront to the first-mentioned pair of support plates 3. The support plates 12 confronting each other are connected to each other by a connecting strip 51, with the bent ends 51a of the strip 51 being secured to the support plates 3 by means of bolts not shown. These support plates are used to support and insulate a vertical bus-bar, not shown, extending through the center of the vertical housing 6. The support plates 12 are also used for supporting shelves for the unit devices 1.

Each switchboard 2 is enclosed and is separated by the side plate 3 from the adjacent unit switchboard 2. As a result, no ventilation occurs between adjacent unit switchboards 2, and accordingly the switchboard 2 in the middle suffers a greater temperature rise. Also, it is difficult to provide wirings interconnecting the unit devices 1 in the adjacent switchboards 2. Moreover, the connection between the suppport plate 12 and the connecting strip 51 in a manner as illustrated does not provide sufficient mechanical strength and hence necessitates reinforcement.

SUMMARY OF THE INVENTION

An object of the invention is to provide an enclosed switchboard, which, when juxtaposed with another enclosed switchboard of the same type, enables ventilation between adjacent switchboards, and facilitates wirings between adjacent switchboards.

Another object of the invention is to provide an enclosed switchboard which has an improved mechanical strength.

A further object of the invention is to provide an enclosed switchboard in which mounting of various devices is facilitated.

According to the invention, there is provided an enclosed switchboard having a pair of side plates disposed in parallel with and to confront each other and connecting members for connecting the side plates to each other to form a vertical box, characterized in that each side plate comprises a substantially flat sheet provided, along both edges thereof, with vertically extending ribs having U-shaped cross-section protruding toward the confronting side plate, the upper and the lower ends of each rib are provided with substantially U-shaped cutaway portions, both ends of each connecting member are formed to fit in the U-shaped cutaway portions, and each side plate is provided with a vertically extending opening and a bent portion protruding from an edge of said opening toward the confronting side plate.

BRIEF DESCRIPTION OF THE DRAWINGS

In the accompanying drawings:

FIG. 3 is a perspective view showing a support plate forming part of the enclosed switchboard shown in FIG. 1;

FIG. 4 is an exploded perspective view showing a vertical housing forming part of an enclosed switchboard according to the invention;

FIG. 5 is an enlarged side view showing how a connecting member is connected with a side plate according to the invention;

FIG. 6 is a plan view, partly broken away, showing an enclosed switchboard according to the invention;

FIG. 7 is a front view, partly broken away, showing the enclosed switchboard shown in FIG. 6; and FIG. 8 is a graph showing the temperature in the switchboards according to the invention, and in the conventional enclosed switchboards.

DESCRIPTION OF THE EMBODIMENT

Figure 1:
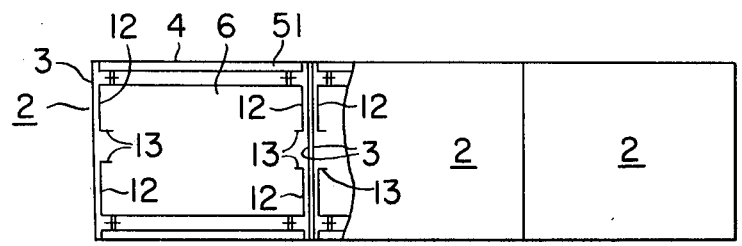
FIG. 1 is a diagrammatic plan view, partially broken away, showing an example of a conventional enclosed switchboard.
Figure 2:
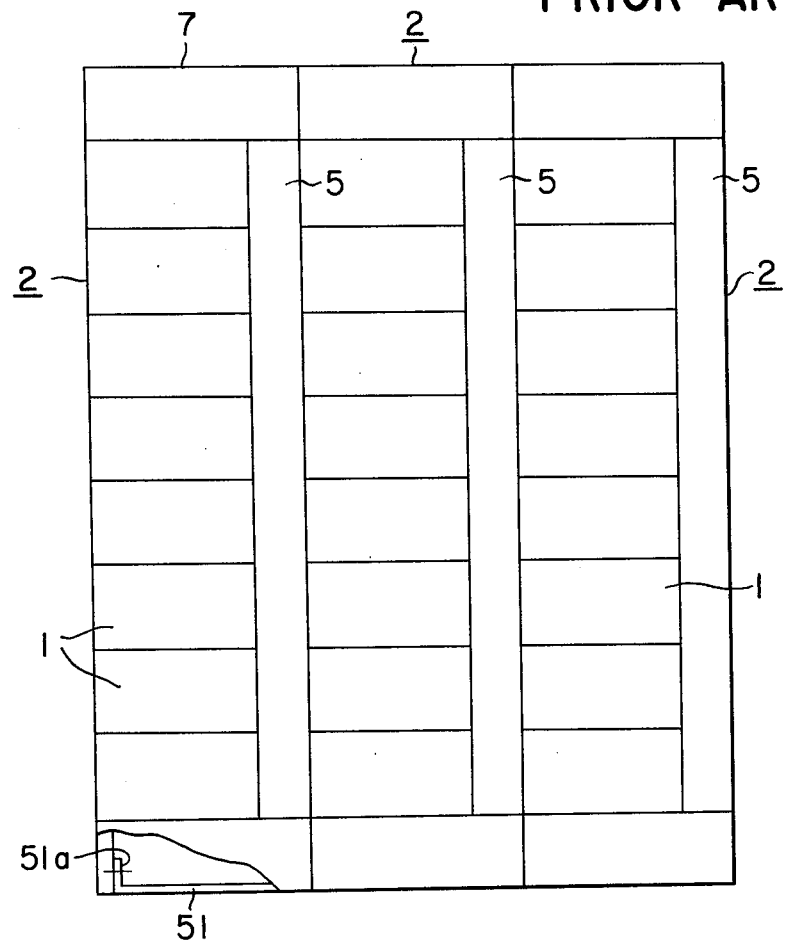
FIG. 2 is a front view, partially broken away, showing the enclosed switchboard shown in FIG. 1.

In FIG. 4, there is shown an example of a side plate 21 which is used to form an enclosed switchboard according to the invention. The side plate 21 is formed of a rectangular metal sheet with its central portion blanked and bent out so that a vertically extending opening 26 and a pair of substantially parallel bent portions 23 are formed. The bent portions 23 are provided with fixing holes 59. Provided along both edges of the plate 21 are ribs 25 having a U-shaped cross-section for reinforcement. The three sides 53, 54 and 55 of the ribs 25 are provided with fixing holes 60 to be used for fixing of the live part protecting covers, reinforcement members, such as those 56 and the like in the switchboard. The bent portions 23 and the ribs 25 are used for fixing various devices in the unit switchboard. The side plate 21 is also provided with cutaway portions 27 at the upper and lower ends of the ribs 25 for engagement with a connecting member 52 in a manner as shown in FIG. 5. As illustrated, the connecting member 52 comprises a channel member having a substantially U-shaped cross-section. The upper extremity 27a of the cutaway portion 27 engages the upper portion 56 of the connecting member 52, so that vertical force, such as weight, is directly transferred between the side plate 21 and the connecting member 52. Also, the external surfaces of the connecting member 52 fit the internal surfaces of the cutaway portion 27, so that mechanical strength necessary to withstand twist and distortion exerted on this engagement portion is improved.

Moreover, an L-shaped lug 52a is fixed to each end of the connecting member 52 and bolted to the side 54 of the rib 25, so that the engagement portion is further rigidified. The side plate 21 is also provided with inwardly bent portions 28 along the upper and lower edges thereof. These bent portions 28 are provided for reinforcement and fixing of the side plates 21.

As illustrated in FIG. 6, a pair of side plates 21 are disposed in parallel with each other, with the bent portions 25 of each side plate 21 extending toward the opposite side plate 21. The side plates are interconnected by connecting members 52 to form a vertical housing 36 constituting an enclosed switchboard 30. The side plates 3 of the conventional switchboard are eliminated. A front panel 33 and a rear plate 32 as well as a top plate, not shown, are fixed in a conventional manner.

As shown in FIGS. 6 and 7, the openings 26 of the adjacent switchboards 30 are aligned with each other, and hence the spaces within the switchboards 30 are in communication with each other through the openings 26.

For instance, three of the switchboards are disposed side by side, with the rightmost and leftmost partition plates being covered with an outer side plates 31. Since the ventilation between the adjacent switchboards is ensured, heat generated in the middle switchboard which has the least heat dissipating surface area is diffused by convection to the right and left switchboards, so that the temperatures in the three switchboards are substantially identical to each other as plotted by black dots in FIG. 8. In contrast, the middle switchboard of the conventional enclosed switchboard suffers from a greater temperature rise as plotted by minute Δ in FIG. 8.

Because the opening 26 extends from the bottom to the top of the side plate 21, conductors to be laterally extended through the switchboards can be positioned at any height, and wirings between a unit device 34 in a switchboard and a unit device 34 in the adjacent switchboard are also facilitated.

Moreover, side plates 3 between switchboards are eliminated, so that cost of the switchboard is reduced.

Furthermore, it should be noted that if the vertically extending opening 26 is provided in the center of the side plate 21 and the bent portion 23 is provided along each of the both edges of the vertically extending opening 26, the partition plate 21 is symmetrical and identical side plates can be used for both sides of the enclosed switchboard, so that cost of providing tools including punches and dies used for blanking and bending is reduced and hence the cost of producing the side plate 21 is reduced.

What is claimed is:

1. In an enclosed switchboard having a pair of side plates disposed in parallel with and to confront each other and connecting members for connecting the side plates to each other to form a vertical box, the improvement wherein each side plate comprises a substantially flat sheet provided, along both edges thereof, with vertically extending ribs having U-shaped cross-section protruding toward the confronting side plate, the upper and the lower ends of each rib are provided with substantially U-shaped cutaway portions, both ends of each connecting member are formed to fit in the U-shaped cutaway portions, and each side plate is provided with a vertically extending opening and a bent portion protruding from an edge of said opening toward the confronting side plate.

2. An enclosed switchboard according to claim 1, wherein the opening extends substantially from the bottom to the top of each side plate.

3. An enclosed switchboard according to claim 1, wherein said opening and said pent portion are formed by blanking and bending out said flat sheet.

4. An enclosed switchboard according to claim 1, wherein said bent portion and said ribs are provided with fixing holes.

5. An enclosed switchboard according to claim 1, wherein said connecting member comprises a channel member.

6. An enclosed switchboard according to claim 5, wherein said connecting member is provided with a vertically extending lug secured to the rib.

7. An enclosed switchboard according to claim 1, wherein said vertically extending opening is provided in the center of each side wall, and said bent portion is provided along each of the both edges of said vertically extending opening.

* * * * *